(12) United States Patent
Zhu

(10) Patent No.: US 11,330,572 B2
(45) Date of Patent: May 10, 2022

(54) METHOD AND DEVICE FOR INDICATING MULTI-SERVICE DATA MULTIPLEX TRANSMISSION, TERMINAL AND BASE STATION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 203 days.

(21) Appl. No.: 16/720,123

(22) Filed: Dec. 19, 2019

(65) Prior Publication Data

US 2020/0128534 A1 Apr. 23, 2020

Related U.S. Application Data

(63) Continuation of application No. PCT/CN2017/095788, filed on Aug. 3, 2017.

(51) Int. Cl.
*H04W 72/04* (2009.01)
*H04L 41/0803* (2022.01)

(52) U.S. Cl.
CPC ..... *H04W 72/0413* (2013.01); *H04L 41/0803* (2013.01); *H04W 72/044* (2013.01)

(58) Field of Classification Search
CPC ............ H04W 72/0413; H04W 72/044; H04L 41/0803
See application file for complete search history.

(56) References Cited

U.S. PATENT DOCUMENTS 9,571,245 B2 2/2017 Wan et al.
2009/0201869 A1* 8/2009 Xu .................. H04L 5/0092
370/329

(Continued)

FOREIGN PATENT DOCUMENTS

CN 101030932 A 9/2007
CN 101854643 A 10/2010

(Continued)

OTHER PUBLICATIONS

First Office Action of the Chinese application No. 201780000825.5, dated Jun. 4, 2021.

(Continued)

*Primary Examiner* — Brenda H Pham
(74) *Attorney, Agent, or Firm* — Syncoda LLC; Feng Ma

(57) ABSTRACT

A method for indicating multiplex transmission of multi-service data includes: detecting that first service data is transmitted on a pre-configured first transmission resource which is a transmission resource capable of multiplex transmission of second service data and the first service data; and service-multiplexing indication information is reported to a base station for the base station to receive the first service data according to the service-multiplexing indication information. Accordingly, the service-multiplexing indication information is reported to the base station to enable the base station to know about a data transmission condition of the terminal and receive the first service data, avoiding invalid detection of the base station and increasing a utilization rate of the transmission resource.

18 Claims, 18 Drawing Sheets

(56) References Cited

U.S. PATENT DOCUMENTS

| | | | |
|---|---|---|---|
| 2014/0177573 A1 | 6/2014 | Han et al. | |
| 2017/0048878 A1 | 2/2017 | Zhang et al. | |
| 2018/0220438 A1* | 8/2018 | Liu | H04W 72/042 |

FOREIGN PATENT DOCUMENTS

| | | |
|---|---|---|
| CN | 102025461 A | 4/2011 |
| CN | 102970761 A | 3/2013 |
| CN | 106413105 A | 2/2017 |
| CN | 106941724 A | 7/2017 |
| WO | 2015165029 A1 | 11/2015 |

OTHER PUBLICATIONS

First Office Action of the India application No. 202047008163, dated Mar. 10, 2021.

International Search Report in the international application No. PCT/CN2017/095788, dated Apr. 26, 2018.

English translation of the Written Opinion of the International Search Authority in the international application No. PCT/CN2017/095788, dated Apr. 26, 2018.

Intel Corporation: "eMBB/URLLC multiplexing for UL", 3GPP Draft; R1-1704764 Intel-URLLC eMBB MUX UL, 3rd Generationpartnershi Project (3GPP), Mobile Competence Centre; 650, Route Des-Lucioles; F-06921 Sophia-Anti Polis Cedex; France vol. RAN WG1, No. Spokane, USA;Apr. 3, 2017-Apr. 7, 2017 Apr. 2, 2017(Apr. 2, 2017), XP051242901, Retrieved from the Internet: URL: http://www.3gpp.org/ftp/Meetings_3GPP_SYNC/RAN1/Docs/ [ retrieved on Apr. 2, 2017 ].

Qualcomm Incorporated: "DL indication channel design principle for URLLC/eMBB dynamic multiplexing", 3GPP Draft; R1-1708637, 3rd Generation Partnershi Pproject (3GPP), Mobi le Competence Centre ; 650 , Route Des Lucioles ; F-0692, vol. RAN WG1, No. Hangzhou; May 15, 2017-201 0519 May 14, 2017 (May 14, 2017), XP051273824, Retrieved from the Internet: URL:http ://www.3gpp.org/ftp/Meetings_3GPP_SYNC/RAN1/Docs/[retrieved on May 14, 2017].

Supplementary European Search Report in the European application No. 17919981.5, dated Aug. 29, 2020.

* cited by examiner

METHOD AND DEVICE FOR INDICATING MULTI-SERVICE DATA MULTIPLEX TRANSMISSION, TERMINAL AND BASE STATION

CROSS-REFERENCE TO RELATED APPLICATION

This application is a continuation of, and claims priority to, international Application No. PCT/CN2017/095788 filed on Aug. 3, 2017, the disclosure of which is hereby incorporated by reference in its entirety.

SUMMARY

The present disclosure generally relates to the technical field of communications, and more specifically to a method and device for indicating multiplex transmission of multi-service data, a method and device for multiplex transmission of multi-service data, a terminal, a base station and a computer-readable storage medium.

Various embodiments of the present disclosure can implement effective multiplexing of a transmission resource.

According to a first aspect of embodiments of the present disclosure, a method for indicating multiplex transmission of multi-service data is provided, including:

it is detected that first service data is transmitted on a first transmission resource which is pre-configured, the first transmission resource being a transmission resource capable of multiplex transmission of second service data and the first service data; and service-multiplexing indication information is reported to a base station for the base station to receive the first service data according to the service-multiplexing indication information.

According to a second aspect of the embodiments of the present disclosure, a method for multiplex transmission of multi-service data is provided, which may include that:

service-multiplexing indication information reported by a terminal is received, the service-multiplexing indication information being transmitted by the terminal when it is detected that first service data is transmitted on a pre-configured first transmission resource and the first transmission resource being a transmission resource capable of multiplex transmission of second service data and the first service data; and the first service data is received according to the service-multiplexing indication information.

According to a third aspect of the embodiments of the present disclosure, a device for indicating multiplex transmission of multi-service data is provided, which may include:

a detection portion, configured to detect that first service data is transmitted on a first transmission resource which is pre-configured, the first transmission resource being a transmission resource capable of multiplex transmission of second service data and the first service data; and a reporting portion, configured to, after the detection portion detects that the first service data is transmitted on the first transmission resource which is pre-configured, report service-multiplexing indication information to a base station for the base station to receive the first service data according to the service-multiplexing indication information.

According to a fourth aspect of the embodiments of the present disclosure, a device for multiplex transmission of multi-service data is provided, which may include:

a first receiving portion, configured to receive service-multiplexing indication information reported by a terminal, the service-multiplexing indication information being transmitted by the terminal when it is detected that first service data is transmitted on a first transmission resource which is pre-configured and the first transmission resource being a transmission resource capable of multiplex transmission of second service data and the first service data; and a second receiving portion, configured to receive the first service data according to the service-multiplexing indication information received by the first receiving portion.

According to a fifth aspect of the embodiments of the present disclosure, a terminal is provided, which may include:

a processor; and a memory configured to store an instruction executable for the processor, wherein the processor may be configured to:

detect that first service data is transmitted on a pre-configured first transmission resource, the pre-configured first transmission resource being a transmission resource capable of multiplex transmission of second service data and the first service data; and report service-multiplexing indication information to a base station for the base station to receive the first service data according to the service-multiplexing indication information.

According to a sixth aspect of the embodiments of the present disclosure, a base station is provided, which may include:

a processor; and a memory configured to store an instruction executable for the processor, wherein the processor may be configured to:

receive service-multiplexing indication information reported by a terminal, the service-multiplexing indication information being transmitted by the terminal when it is detected that first service data is transmitted on a pre-configured first transmission resource and the pre-configured first transmission resource being a transmission resource capable of multiplex transmission of second service data and the first service data; and receive the first service data according to the service-multiplexing indication information.

According to a seventh aspect of the embodiments of the present disclosure, a computer-readable storage medium is provided, which may have a computer program stored thereon, the program, when executed by a processor, enables to implement the blocks of the method for multiplex transmission of multi-service data.

According to an eighth aspect of the embodiments of the present disclosure, a computer-readable storage medium is provided, which may have a computer program stored thereon, the program, when executed by a processor, enables to implement the blocks of the method for multiplex transmission of multi-service data.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
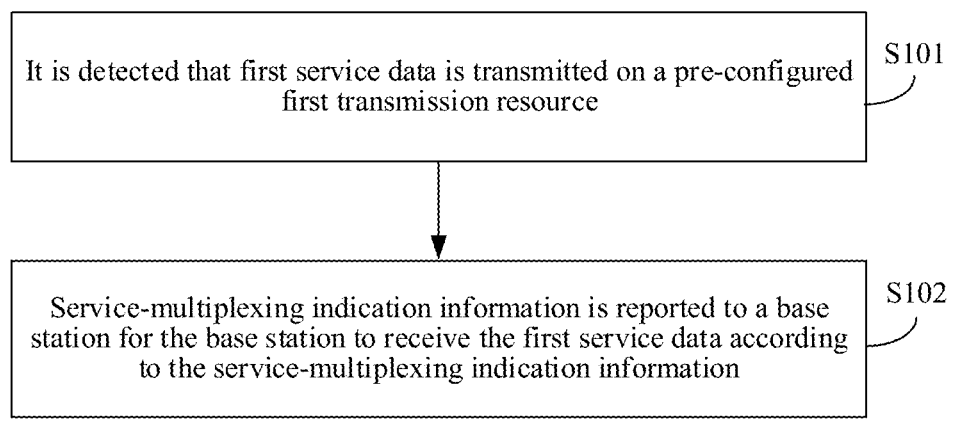
FIG. 1 is a flowchart illustrating a method for indicating multiplex transmission of multi-service data according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Along with constant emergence of new Internet applications such as new-generation Augmented Reality (AR), Virtual Reality (VR) and vehicle-to-vehicle communication and the like, higher requirements have been made to wireless communication technologies, which promote gradual evolution of the wireless communication technologies to meet requirements of applications. At present, a cellular mobile communication technology is in an evolution stage of a new-generation technology. An important characteristic of the new-generation technology is that flexible configuration of multiple service types is supported. Different service types have different requirements on a wireless communication technology, for example, a main requirement from an enhanced Mobile Broad Band (eMBB) service type focuses on high bandwidth, high rate and the like, and a main requirement from an Ultra Reliable Low Latency Communication (URLLC) service type focuses on higher reliability and lower delay, and a main requirement from a massive Machine Type Communication (mMTC) service type focuses on more connections. Therefore, a new-generation wireless communication system needs a flexible and configurable design to support data transmission of multiple service types.

Since different services have different performance requirements, the present disclosure is to discuss how to effectively multiplex a transmission resource when data of different services need to be transmitted on the same working frequency band.

For effectively multiplexing a transmission resource, data of different service types may be transmitted respectively by using different time-frequency resources statically or semi-statically. For example, data of different service types may be transmitted through the same time-domain resource and different frequency-domain resources, and the data of different service types may also be transmitted through the same frequency-domain resource and different time-domain resources.

Since downlink service data is transmitted based on grant, for downlink dynamic service multiplexing, a terminal may receive data of a service on a corresponding resource.

For uplink service multiplexing, a base station cannot acquire a distribution of a service with a relatively high delay requirement, for example, a URLLC service, on a terminal side, and thus grant-based transmission cannot meet the delay requirement of such a service type. In addition, uplink may support a grant-free transmission, namely the base station may semi-statically configure some time-frequency resources for transmission of a service, for example, the URLLC service, and in such case, once the terminal has an uplink URLLC service to be transmitted, the terminal may directly perform data transmission on the configured resources. However, in such a transmission manner, other types of service data that is being transmitted may be influenced.

FIG. 1 is a flowchart illustrating a method for indicating multiplex transmission of multi-service data according to some embodiments of the present disclosure. The embodiment is described from a terminal side. As shown in FIG. 1, the method for multiplex transmission of multi-service data includes the following blocks.

In the block S101, it is detected that first service data is transmitted on a pre-configured first transmission resource, the first transmission resource being a transmission resource capable of multiplex transmission of second service data and the first service data.

The first service data has higher priority than the second service data. For example, a delay requirement of the first service data is higher than that of the second service data. The first service data may include, but not limited to, URLLC data, and the second service data may include, but not limited to, eMBB data.

In the block S102, service-multiplexing indication information is reported to a base station for the base station to receive the first service data according to the service-multiplexing indication information.

The service-multiplexing indication information may include at least one of a time-domain resource position occupied by the first service data and a frequency-domain resource position occupied by the first service data, and may further include a transmission waveform for the first service data.

When the service-multiplexing indication information includes the time-domain resource position occupied by the first service data, the time-domain resource position may be indicated based on a structure of a time-domain transmission unit of the first service data, may also be indicated based on a structure of a time-domain transmission unit of the second service data, and may also be indicated based on a structure of a predefined or predetermined time-domain transmission unit.

The time-domain transmission unit of the first service data, the time-domain transmission unit of the second service data and a predefined or default time-domain transmission unit may transmit service data by taking an Orthogonal Frequency Division Multiplexing (OFDM) symbol (for convenient description, the OFDM symbol is called as a symbol for short hereinafter), a slot, a subframe or a radio frame, etc. as a unit; each time-domain transmission unit may include the first transmission resource and a second transmission resource, and the second transmission resource may be configured to transmit the second service data.

When the service-multiplexing indication information includes the frequency-domain resource position, the frequency-domain resource position may be indicated based on a PRB or a predefined frequency-domain resource unit.

In the embodiment, the terminal, after it is detected that the first service data is transmitted on the first transmission resource that may be multiplexed to transmit the first service data and the second service data, may report the service-multiplexing indication information to the base station through a PUCCH, a PUSCH or a newly defined channel. For example, service-multiplexing indication information of each transmission unit corresponding to the first transmission resource may be reported to the base station through the PUCCH, the PUSCH or the newly defined channel, and the service-multiplexing indication information of all or part of the transmission units corresponding to the first transmission resource may also be simultaneously reported to the base station through the PUCCH, the PUSCH or the newly defined channel. The base station, after receiving the service-multiplexing indication information, may receive the first service data according to the service-multiplexing indication information.

According to the embodiment, when it is detected that the first service data is transmitted on the first transmission resource that may be multiplexed to transmit the first service data and the second service data, the service-multiplexing indication information may be reported to the base station to enable the base station to know about a data transmission condition of the terminal according to the service-multiplexing indication information and receive the first service data, so that invalid detection of the base station can be avoided, and a utilization rate of the transmission resource can be increased.

Figure 2:
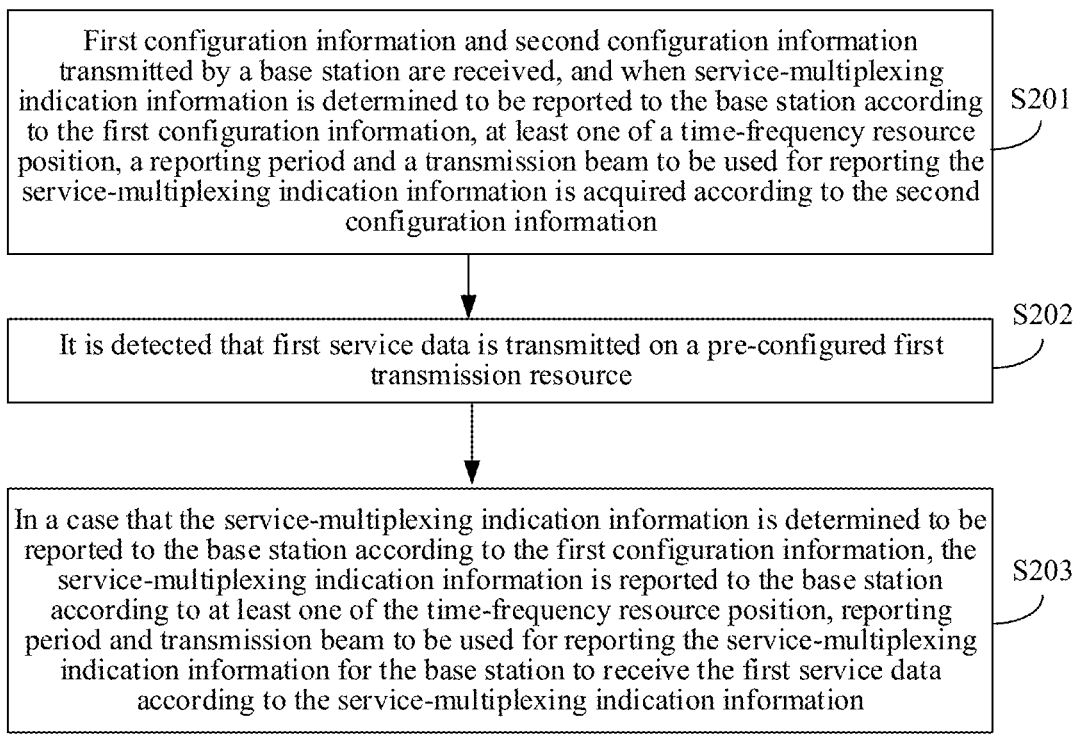
FIG. 2 is a flowchart illustrating another method for indicating multiplex transmission of multi-service data according to some embodiments of the present disclosure.

FIG. 2 is a flowchart illustrating another method for indicating multiplex transmission of multi-service data according to some embodiments of the present disclosure. As shown in FIG. 2, the method may include the following blocks.

In block S201, first configuration information and second configuration information transmitted by a base station are received, and when service-multiplexing indication information is determined to be reported to the base station according to the first configuration information, at least one of a time-frequency resource position, a reporting period and a transmission beam to be used for reporting the service-multiplexing indication information is acquired according to the second configuration information.

A terminal may determine whether to report the service-multiplexing indication information to the base station or not according to the first configuration information. The first configuration information or the second configuration information may be contained in RRC signaling, a MAC CE or physical-layer signaling.

In the embodiment, the first configuration information and the second configuration information may be the same configuration information, namely, the following information may be contained in the same configuration information: information about whether to report the service-multiplexing indication information to the base station or not, and at least one of a time-frequency resource position, a reporting period and a transmission beam to be used for reporting the service-multiplexing indication information, and other information. The first configuration information and the second configuration information may also be different configuration information, namely, information about whether to report the service-multiplexing indication information to the base station or not and information including at least one of a time-frequency resource position, a reporting period and a transmission beam to be used for reporting the service-multiplexing indication information may be contained in different configuration information.

In block S202, it is detected that first service data is transmitted on a pre-configured first transmission resource, the first transmission resource being a transmission resource capable of multiplex transmission of second service data and the first service data.

In block S203, when the service-multiplexing indication information is determined to be reported to the base station according to the first configuration information, the service-multiplexing indication information is reported to the base station according to at least one of the time-frequency resource position, reporting period and transmission beam to be used for reporting the service-multiplexing indication information, for the base station to receive the first service data according to the service-multiplexing indication information.

In the embodiment, the terminal may acquire at least one of the time-frequency resource position, reporting period and transmission beam to be used for reporting the service-multiplexing indication information from the configuration information transmitted by the base station and report the service-multiplexing indication information to the base station according to at least one of the time-frequency resource position, reporting period and transmission beam to be used for reporting the service-multiplexing indication information.

In addition, the terminal may also report the service-multiplexing indication information to the base station according to information predetermined with the base station, the information including at least one of the time-frequency resource position, reporting period and transmission beam to be used for reporting the service-multiplexing indication information. In some embodiments, the terminal may further receive at least one of the time-frequency resource position, reporting period and transmission beam to be used for reporting the service-multiplexing indication information from the configuration information transmitted by the base station in a predefined manner and report the service-multiplexing indication information to the base station according to at least one of the time-frequency resource position, reporting period and transmission beam to be used for reporting the service-multiplexing indication information.

It may be seen that the terminal may acquire, in multiple manners, at least one of the time-frequency resource position, reporting period and transmission beam to be used for reporting the service-multiplexing indication information. The implementation manners are flexible and diversified.

According to the embodiment, the first configuration information and second configuration information may be received from the base station, and at least one of the time-frequency resource position, reporting period and transmission beam to be used for reporting the service-multiplexing indication information may be acquired according to the first configuration information and the second configuration information. Therefore, when it is detected that the first service data is transmitted on the first transmission resource that may be multiplexed to transmit the first service data and the second service data, the service-multiplexing indication information may be reported to the base station according to at least one of the time-frequency resource position, reporting period and transmission beam to be used for reporting the service-multiplexing indication information to enable the base station to receive the first service data according to the service-multiplexing indication information.

Figure 3:
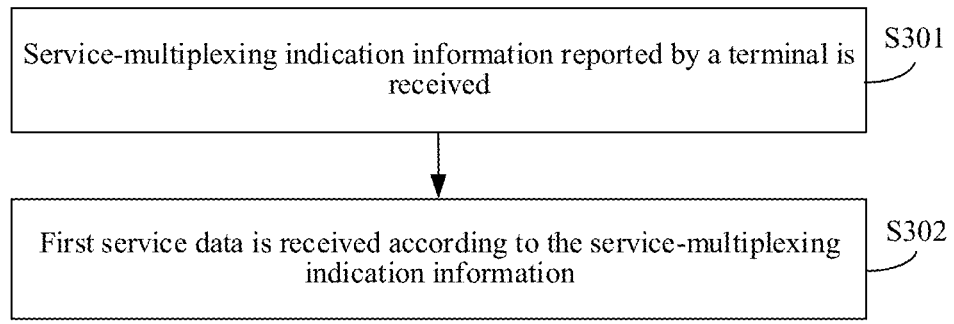
FIG. 3 is a flowchart illustrating a method for multiplex transmission of multi-service data according to some embodiments of the present disclosure.

FIG. 3 is a flowchart illustrating a method for multiplex transmission of multi-service data according to some embodiments of the present disclosure. The embodiment is described from a base station side. As shown in FIG. 3, the method for multiplex transmission of multi-service data includes the following blocks.

In block S301, service-multiplexing indication information reported by a terminal is received, the service-multiplexing indication information being transmitted by the terminal when it is detected that first service data is transmitted on a pre-configured first transmission resource and the first transmission resource being a transmission resource capable of multiplex transmission of second service data and the first service data.

The service-multiplexing indication information may include at least one of a time-domain resource position occupied by the first service data and a frequency-domain resource position occupied by the first service data, and may further include a transmission waveform for the first service data.

When the service-multiplexing indication information includes the time-domain resource position occupied by the first service data, the time-domain resource position may be indicated based on a structure of a time-domain transmission unit of the first service data, may also be indicated based on a structure of a time-domain transmission unit of the second service data, and may also be indicated based on a structure of a predefined or predetermined time-domain transmission unit.

The time-domain transmission unit of the first service data, the time-domain transmission unit of the second service data and a predefined or default time-domain transmission unit may transmit service data by taking an OFDM symbol, a slot, a subframe or a radio frame, etc. as a unit; each time-domain transmission unit may include the first transmission resource and a second transmission resource, and the second transmission resource may be configured to transmit the second service data.

When the service-multiplexing indication information includes the frequency-domain resource position, the frequency-domain resource position may be indicated based on a PRB.

Priority of the first service data is higher than priority of the second service data. For example, a delay requirement of the first service data is higher than that of the second service data. The first service data may include, but not limited to, URLLC data, and the second service data may include, but not limited to, eMBB data.

In block S302, the first service data is received according to the service-multiplexing indication information.

In the embodiment, the first service data may be parsed according to at least one of a time-domain resource position, a frequency-domain resource position and a transmission waveform occupied by the first service data, and the first service data is received. For example, the first service data may be parsed according to the transmission waveform for the first service data, and the first service data is received.

According to the embodiment, the service-multiplexing indication information reported by the terminal may be received, a data transmission condition of the terminal may be obtained according to the service-multiplexing indication information, and then the first service data may be received, so that invalid detection of a base station can be avoided, and a utilization rate of the transmission resource can be increased.

Figure 4A:
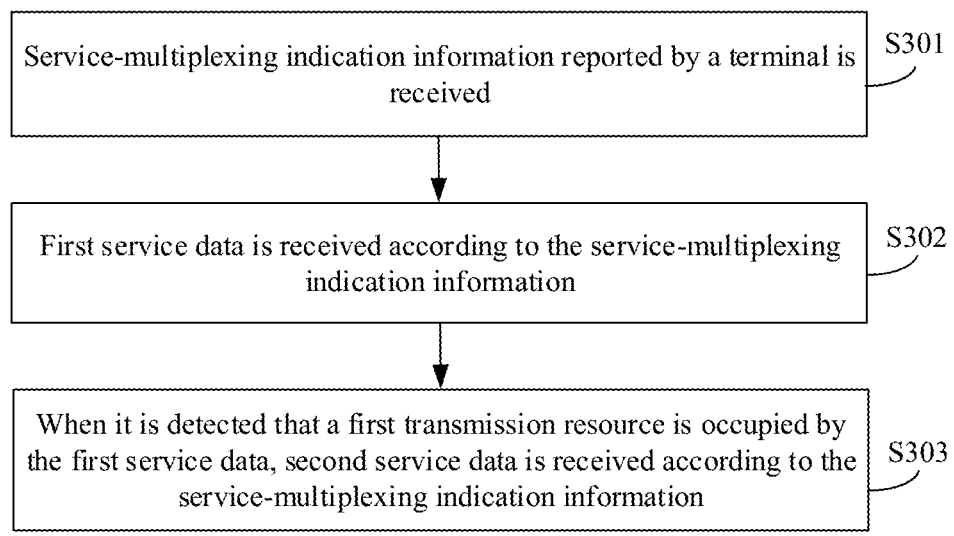
FIG. 4A is a flowchart illustrating another method for multiplex transmission of multi-service data according to some embodiments of the present disclosure.

FIG. 4A is a flowchart illustrating another method for multiplex transmission of multi-service data according to some embodiments of the present disclosure. As shown in FIG. 4A, after S302, the method may further include the following block.

In block S303, when it is detected that the first transmission resource is occupied by the first service data, the second service data is received according to the service-multiplexing indication information.

The first service data may have higher priority than the second service data.

In the embodiment, after the first service data is parsed according to at least one of the time-domain resource position, frequency-domain resource position and transmission waveform for the first service data, the first service data may be removed from parsed service data on the first transmission resource, for example, the first service data parsed according to the transmission waveform for the first service data may be removed from the parsed service data on the first transmission resource, to obtain the second service data on the first transmission resource. The second service data on a second transmission resource may be parsed and received in a commonly used manner.

According to the embodiment, when it is detected that the first transmission resource is occupied by the first service data, the second service data may be received according to the service-multiplexing indication information, so that multiplex transmission of multiple service data can be implemented.

Figure 4B:
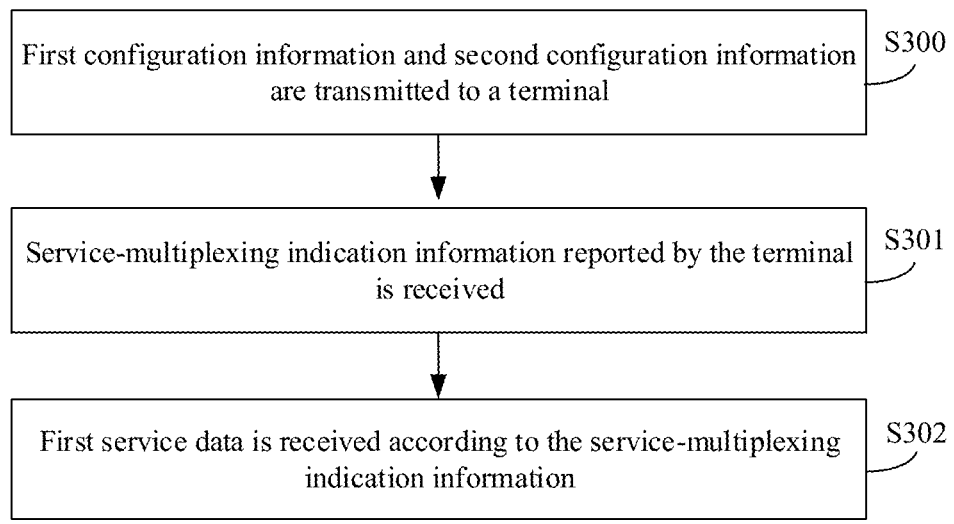
FIG. 4B is a flowchart illustrating another method for multiplex transmission of multi-service data according to some embodiments of the present disclosure.

FIG. 4B is a flowchart illustrating another method for multiplex transmission of multi-service data according to some embodiments of the present disclosure. As shown in FIG. 4B, after S301, the method may further include the following block.

In block S300, first configuration information and second configuration information are transmitted to the terminal; the first configuration information is for configuring the terminal whether to report the service-multiplexing indication information or not and, in a case that the terminal is configured by the first configuration information to report the service-multiplexing indication information, the second configuration information includes at least one of a time-frequency resource position, reporting period and transmission beam to be used for reporting the service-multiplexing indication information.

The first configuration information or the second configuration information may be contained in RRC signaling, a MAC CE or physical-layer signaling.

In the embodiment, the first configuration information and the second configuration information may be the same configuration information, namely, information about whether to report the service-multiplexing indication information to the base station or not and information including at least one of a time-frequency resource position, a reporting period and a transmission beam to be used for reporting the service-multiplexing indication information may be contained in the same configuration information. The first configuration information and the second configuration information may also be different configuration information, namely, information about whether to report the service-multiplexing indication information to the base station or not as well as information including at least one of a time-frequency resource position, a reporting period and a transmission beam to be used for reporting the service-multiplexing indication information may be contained in different configuration information.

In addition, the base station may also transmit at least one of the time-frequency resource position, reporting period and transmission beam to be used for reporting the service-multiplexing indication information to the terminal in a predefined manner.

According to the embodiment, the first configuration information and the second configuration information may be transmitted to the terminal to enable the terminal to acquire at least one of the time-frequency resource position, reporting period and transmission beam to be used for reporting the service-multiplexing indication information according to the first configuration information and the second configuration information, thereby providing a condition for subsequently reporting the service-multiplexing indication information to the base station according to at least one of the time-frequency resource position, reporting period and transmission beam to be used for reporting the service-multiplexing indication information.

Figure 5A:
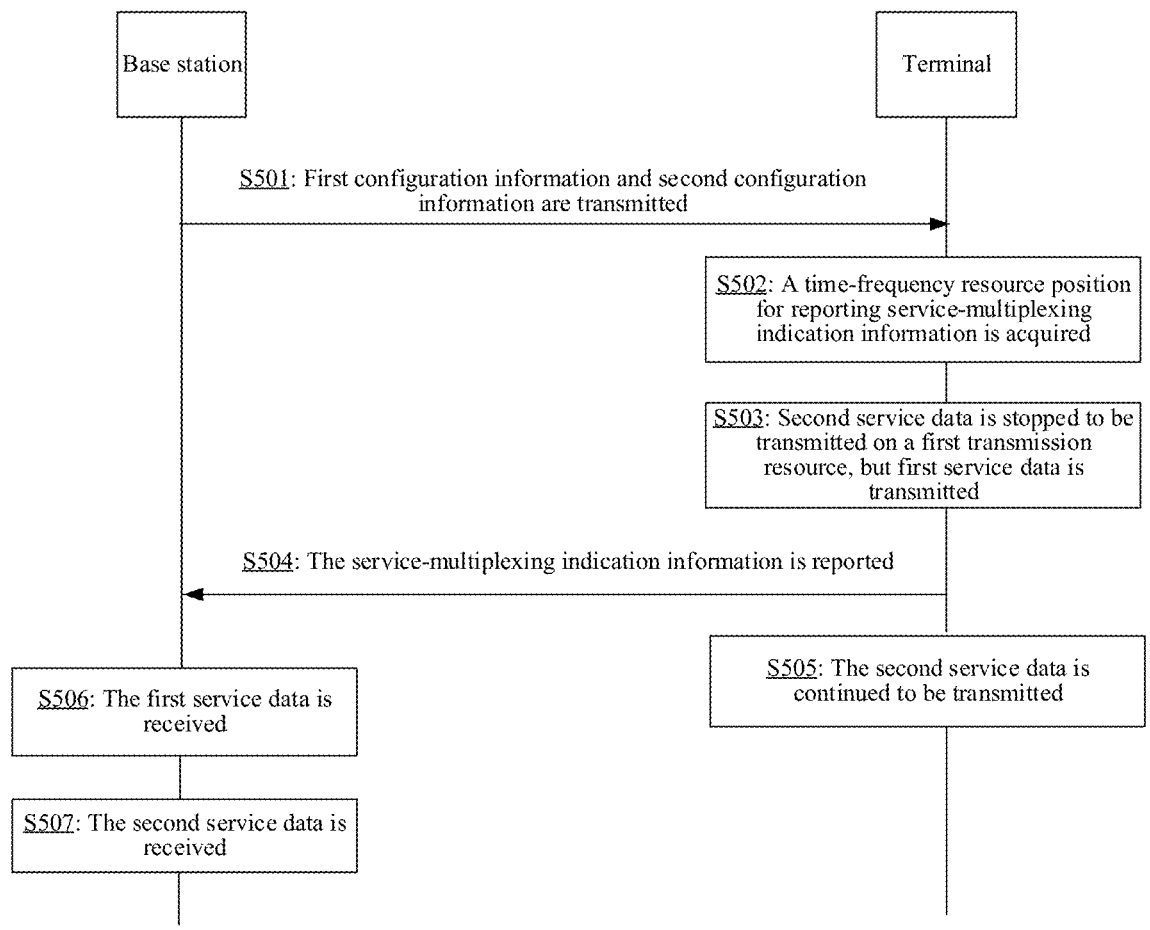
FIG. 5A is a signaling flowchart illustrating a method for multiplex transmission of multi-service data according to some embodiments of the present disclosure.

FIG. 5A is a flowchart illustrating a method for multiplex transmission of multi-service data according to some embodiments of the present disclosure. The embodiment is described with multiplex transmission of two types of service data by a certain terminal as an example. As shown in FIG. 5A, the method includes the following blocks.

In block S501, a base station transmits first configuration information and second configuration information to the terminal through RRC signaling, the first configuration information being for configuring the terminal to report service-multiplexing indication information and the second configuration information including information about a time-frequency resource position for reporting the service-multiplexing indication information.

In block S502, the terminal acquires the time-frequency resource position for reporting the service-multiplexing indication information according to the first configuration information and the second configuration information.

In block S503, the terminal, when it is confirmed that a first transmission resource is occupied by first service data, stops transmitting second service data on the first transmission resource but transmits the first service data.

In the embodiment, the base station may pre-configure the first transmission resource that may be multiplexed to transmit the first service data and the second service data in each transmission unit for the terminal. In addition, each transmission unit may include a second transmission resource, the second transmission resource being configured to transmit the second service data. Priority of the first service data is higher than priority of the second service data.

In the embodiment, descriptions are made with an example that URLLC service data is the first service data and eMBB service data is the second service data.

Figure 5B:
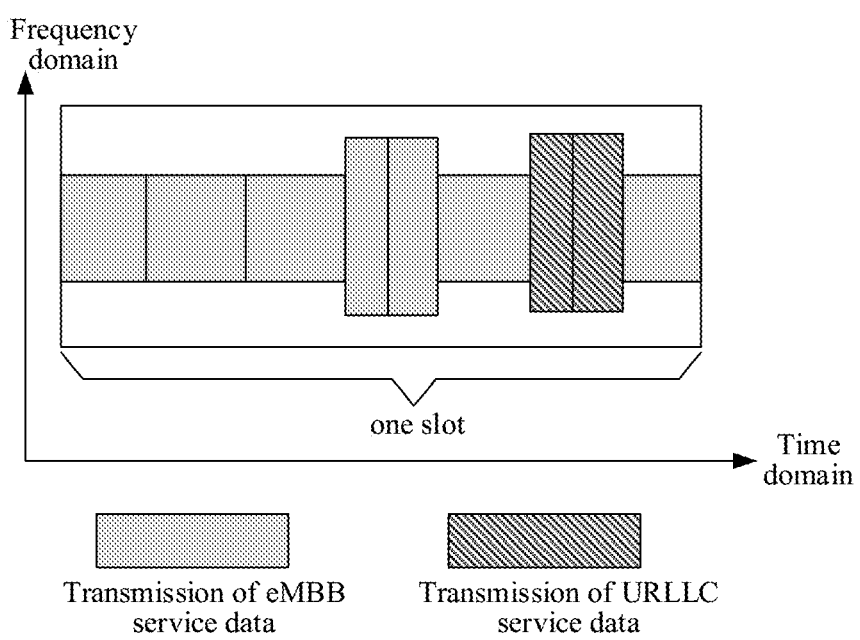
FIG. 5B is a first schematic diagram illustrating multiplex transmission of multiple service data through a transmission unit according to some embodiments of the present disclosure.

As shown in FIG. 5B, a present transmission unit transmits service data by taking a slot as a unit, the slot including seven symbols. In a case that the first resource pre-configured for the terminal by the base station includes the fourth symbol and the sixth symbol, the second transmission resource includes the other five symbols. As shown in FIG. 5B, there are two opportunities on each of the fourth symbol and the sixth symbols for transmitting URLLC service data.

In a case that a terminal is transmitting the eMBB service data based on a grant and the terminal needs to transmit URLLC service data, the terminal may transmit the URLLC service data on the configured first resource, i.e., the fourth symbol and the sixth symbol. As shown in FIG. 5B, a resource for grant-based transmission of the eMBB service collides with the configured resource for transmission of URLLC service data, namely the configured resource for transmission of URLLC service data is the first transmission resource and the resource for grant-based transmission of the eMBB service data includes the first transmission resource, and in such case, the terminal may stop transmitting the eMBB service data on the first transmission resource.

In block S504, the terminal, when it is detected that the first service data is transmitted on the first transmission resource, reports the service-multiplexing indication information to the base station at the time-frequency resource position in the second configuration information.

In a case that the terminal selects to transmit the URLLC service data on the two URLLC transmission opportunities on the sixth symbol, the terminal, after it is detected that the URLLC service data is transmitted on the first transmission resource, may report the service-multiplexing indication information to the base station at the time-frequency resource position in the second configuration information.

The service-multiplexing indication information may include a time-domain resource position, a frequency-domain resource position and a transmission waveform occupied by the first service data. The time-domain resource position may be indicated based on a structure of a time-domain transmission unit of the first service data, and for example, may be indicated based on structures of the fourth symbol and sixth symbol in FIG. 5B. Since the terminal selects to transmit the URLLC service data on the two URLLC transmission opportunities on the sixth symbol, 0011 may be adopted to represent the service-multiplexing indication information. The frequency-domain resource position may be indicated based on a PRB.

In block S505, the terminal, after completing transmitting the first service data, continues transmitting the second service data.

In block S506, the base station receives the first service data according to the service-multiplexing indication information.

In block S507, the base station, when it is detected that the first transmission resource is occupied by the first service data, receives the second service data according to the service-multiplexing indication information.

In the embodiment, the base station, after the first service data is parsed according to the time-domain resource position and the transmission waveform occupied by the first service data, may remove the first service data from parsed service data on the first transmission resource, thereby obtaining the second service data on the first transmission resource.

According to the embodiment, the terminal reports the service-multiplexing indication information to the base station through interaction between the base station and the terminal to enable the base station to know about a data transmission condition of the terminal according to the service-multiplexing indication information and then receive the first service data and the second service data, so that invalid detection of the base station can be avoided, and a utilization rate of the transmission resource can be increased.

Figure 6A:
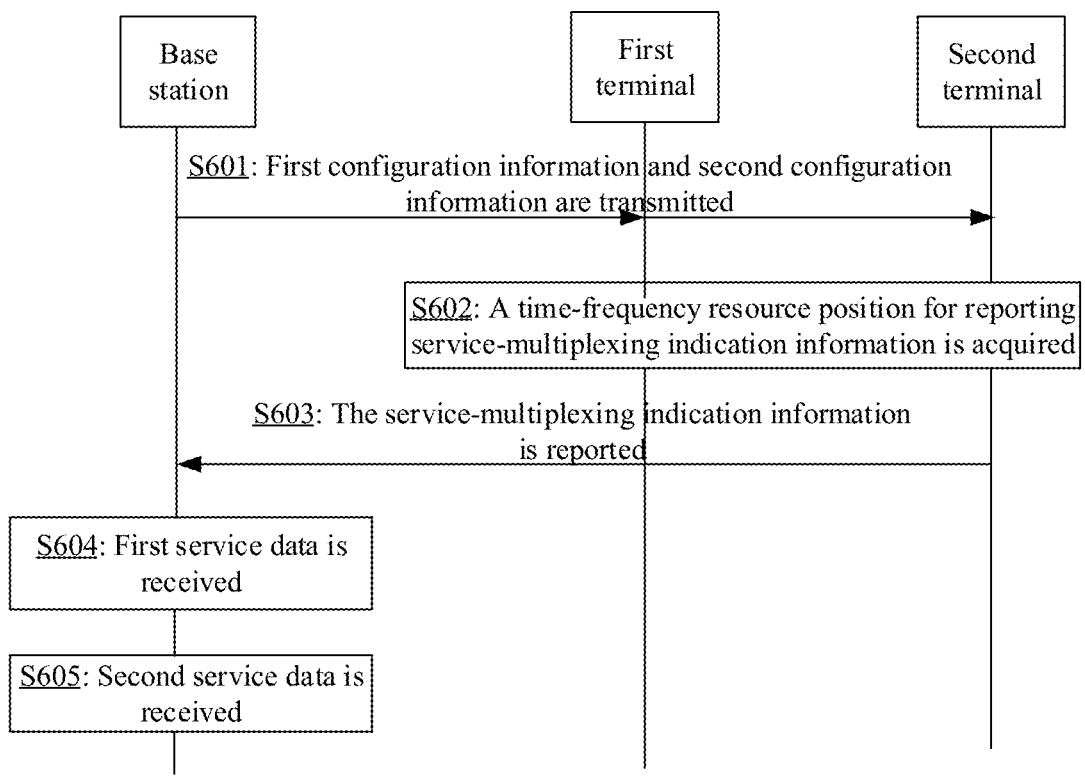
FIG. 6A is a signaling flowchart illustrating another method for multiplex transmission of multi-service data according to some embodiments of the present disclosure.

FIG. 6A is a flowchart illustrating another method for multiplex transmission of multi-service data according to some embodiments of the present disclosure. The embodiment is described with transmission of two types of service data by two terminals as an example. As shown in FIG. 6A, the method includes the following blocks.

In block S601, a base station transmits first configuration information and second configuration information to a first terminal and a second terminal through RRC signaling, the first configuration information being for configuring the terminals to report service-multiplexing indication information and the second configuration information including information about a time-frequency resource position for reporting the service-multiplexing indication information.

In block S602, the first terminal and the second terminal acquire the time-frequency resource position for reporting the service-multiplexing indication information according to the first configuration information and the second configuration information.

In block S603, the second terminal, when it is detected that first service data is transmitted on a first transmission resource, reports the service-multiplexing indication information to the base station at the time-frequency resource position indicated in the second configuration information.

In the embodiment, the base station may pre-configure the first transmission resource capable of multiplex transmission of second service data and the first service data in each transmission unit for the terminal. In addition, each transmission unit may include a second transmission resource, the second transmission resource being configured to transmit the second service data. The first service data may have higher priority than the second service data.

In the embodiment, descriptions are made with an example that URLLC service data is the first service data and eMBB service data is the second service data as an example.

Figure 6B:
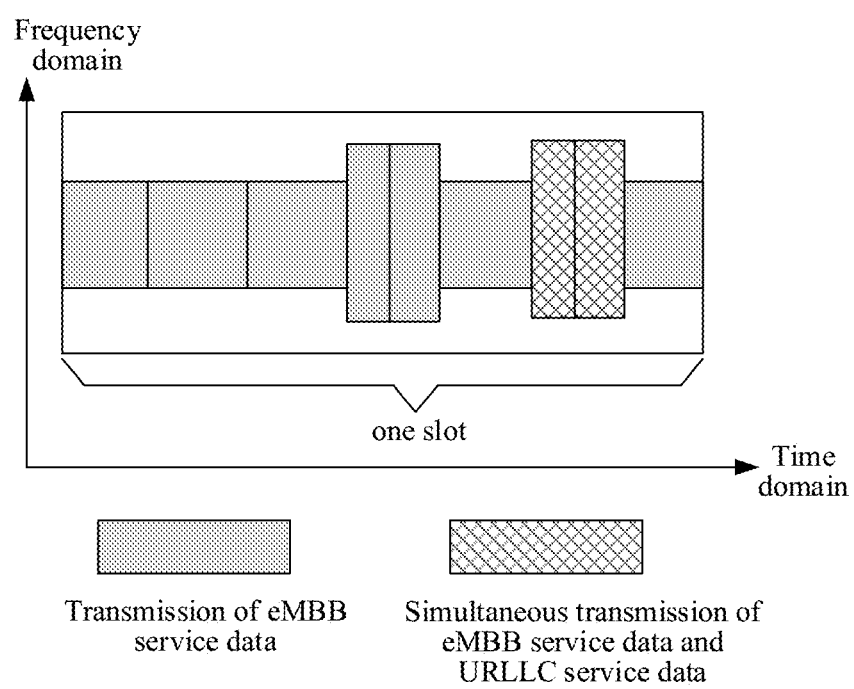
FIG. 6B is a second schematic diagram illustrating multiplex transmission of multiple service data through a transmission unit according to some embodiments of the present disclosure.

As shown in FIG. 6B, a transmission unit transmits service data by taking a slot as a unit, the slot including seven symbols. In a case that the first resource pre-configured for the terminal by the base station includes the fourth symbol and the sixth symbol, the second transmission resource includes the other five symbols. As shown in FIG. 6B, there are two opportunities for transmission of URLLC service data on each of the fourth symbol and the sixth symbols.

In a case that the first terminal is transmitting the eMBB service data based on a grant and the second terminal needs to transmit URLLC service data, the second terminal may transmit the URLLC service data on the configured first resource, i.e., the fourth symbol and the sixth symbol. As shown in FIG. 6B, a resource for grant-based transmission of the eMBB service by the first terminal collides with the resource configured for the second terminal to transmit the URLLC service data, namely, the resource configured for the second terminal to transmit URLLC service data is the first transmission resource and the resource granted for the first terminal for transmission of the eMBB service data includes the first transmission resource, and in such case, the first terminal may transmit the eMBB service data on the first transmission resource and the second terminal may also transmit the URLLC service data on the first transmission resource.

In a case that the second terminal selects to transmit the URLLC service data on the latter opportunity for URLLC transmission on the sixth symbol, the second terminal, after the URLLC service data is detected to be transmitted on the first transmission resource, may report the service-multiplexing indication information to the base station at the time-frequency resource position in the second configuration information.

The service-multiplexing indication information may include a time-domain resource position, frequency-domain resource position and transmission waveform occupied by the first service data. The time-domain resource position may be indicated based on a structure of a time-domain transmission unit of the first service data, and for example, may be indicated based on structures of the fourth symbol and sixth symbol in FIG. 5B. Since the first terminal selects to transmit the URLLC service data on the latter URLLC transmission opportunity on the sixth symbol, 0001 may be adopted to represent indication information about the time-domain resource position contained in the service-multiplexing indication information.

In block S604, the base station receives the first service data according to the service-multiplexing indication information.

In block S605, the base station, when it is detected that the first transmission resource is occupied by the first service data, receives second service data according to the service-multiplexing indication information.

In the embodiment, the base station, after the first service data is parsed according to the time-domain resource position and transmission waveform occupied by the first service data, may remove the first service data from parsed service data on the first transmission resource, thereby obtaining the second service data on the first transmission resource.

According to the embodiment, the terminal reports the service-multiplexing indication information to the base station through interaction between the base station and the terminal to enable the base station to know about a data transmission condition of the terminal according to the service-multiplexing indication information and then receive the first service data and the second service data, so that invalid detection of the base station can be avoided, and a utilization rate of the transmission resource can be increased.

Figure 7:
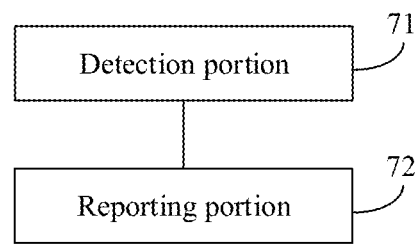
FIG. 7 is a block diagram of a device for indicating multiplex transmission of multi-service data according to some embodiments of the present disclosure.

FIG. 7 is a block diagram of a device for indicating multiplex transmission of multi-service data according to some embodiments of the present disclosure. As shown in FIG. 7, the device for multiplex transmission of multi-service data includes a detection portion 71 and a reporting portion 72.

The detection portion 71 is configured to detect that first service data is transmitted on a pre-configured first transmission resource, the first transmission resource being a transmission resource capable of multiplex transmission of second service data and the first service data.

The first service data may have higher priority than the second service data. For example, a delay requirement of the first service data is higher than that of the second service data. The first service data may include, but not limited to, URLLC data, and the second service data may include, but not limited to, eMBB data.

The reporting portion 72 is configured to, after the detection portion 71 detects that the first service data is transmitted on the pre-configured first transmission resource, report service-multiplexing indication information to a base station for the base station to receive the first service data according to the service-multiplexing indication information.

The service-multiplexing indication information may include at least one of a time-domain resource position occupied by the first service data and a frequency-domain resource position occupied by the first service data, and may further include a transmission waveform for the first service data.

When the service-multiplexing indication information includes the time-domain resource position occupied by the first service data, the time-domain resource position may be indicated based on a structure of a time-domain transmission unit of the first service data, may also be indicated based on a structure of a time-domain transmission unit of the second service data, and may also be indicated based on a structure of a predefined or predetermined time-domain transmission unit.

The time-domain transmission unit of the first service data, the time-domain transmission unit of the second service data and a predefined or default time-domain transmission unit may transmit service data by taking an OFDM symbol, a slot, a subframe or a radio frame, etc. as a unit; each time-domain transmission unit may include the first transmission resource and a second transmission resource, and the second transmission resource may be configured to transmit the second service data.

When the service-multiplexing indication information includes the frequency-domain resource position, the frequency-domain resource position may be indicated based on a PRB or a predefined frequency-domain resource unit.

The base station, after receiving the service-multiplexing indication information, may receive the first service data according to the service-multiplexing indication information.

According to the embodiment, when it is detected that the first service data is transmitted on the first transmission resource that may be multiplexed to transmit the first service data and the second service data, the service-multiplexing indication information may be reported to the base station to enable the base station to know about a data transmission condition of a terminal according to the service-multiplexing indication information and receive the first service data, so that invalid detection of the base station can be avoided, and a utilization rate of the transmission resource can be increased.

Figure 8A:
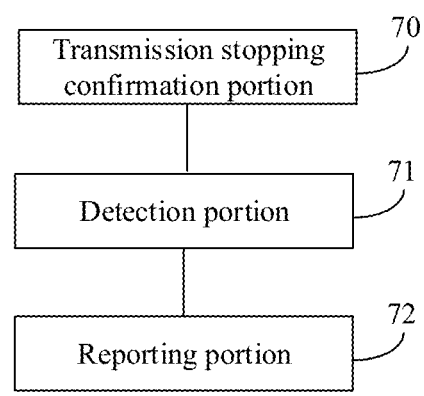
FIG. 8A is a block diagram of another device for indicating multiplex transmission of multi-service data according to some embodiments of the present disclosure.

FIG. 8A is a block diagram of another device for indicating multiplex transmission of multi-service data according to some embodiments of the present disclosure. As shown in FIG. 8A, based on the embodiment shown in FIG. 7, the device may further include a transmission stopping confirmation portion 70.

The transmission stopping confirmation portion 70 is configured to, before the detection portion 71 detects that the first service data is transmitted on the pre-configured first transmission resource, in a case that it is confirmed that the first transmission resource is occupied by the first service data, stop transmitting the second service data on the first transmission resource, the first service data having higher priority than the second service data.

According to the embodiment, when it is confirmed that the first transmission resource is occupied by the first service data, the second service data is stopped to be transmitted on the first transmission resource, so that multiplex transmission of data of multiple service types is implemented.

Figure 8B:
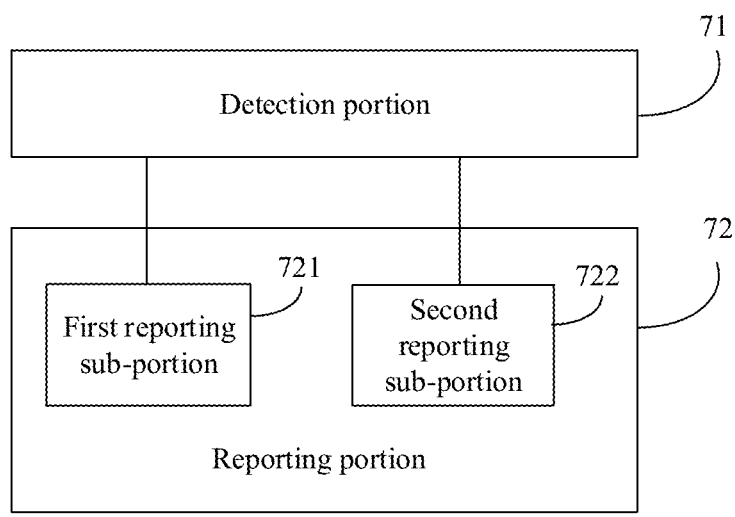
FIG. 8B is a block diagram of another device for indicating multiplex transmission of multi-service data according to some embodiments of the present disclosure.

FIG. 8B is a block diagram of another device for indicating multiplex transmission of multi-service data according to some embodiments of the present disclosure. As shown in FIG. 8B, based on the embodiment shown in FIG. 7, the reporting portion 72 may include a first reporting sub-portion 721 or a second reporting sub-portion 722.

The first reporting sub-portion 721 is configured to report service-multiplexing indication information of each transmission unit corresponding to the first transmission resource to the base station through a PUCCH, a PUSCH or a newly defined channel.

The second reporting sub-portion 722 is configured to simultaneously report the service-multiplexing indication information of all or part of transmission units corresponding to the first transmission resource to the base station through a PUCCH, a PUSCH or a newly defined channel.

In the embodiment, the terminal, after the first service data is detected to be transmitted on the first transmission resource that may be multiplexed to transmit the first service data and the second service data, may report the service-multiplexing indication information to the base station through a PUCCH, a PUSCH or a newly defined channel. For example, service-multiplexing indication information of each transmission unit corresponding to the first transmission resource may be reported to the base station through the PUCCH, the PUSCH or the newly defined channel, and the service-multiplexing indication information of all or part of the transmission units corresponding to the first transmission resource may also be simultaneously reported to the base station through the PUCCH, the PUSCH or the newly defined channel.

According to the embodiment, the service-multiplexing indication information may be reported to the base station in multiple manners through multiple channels, so that implementation manners can be flexible and diversified.

Figure 8C:
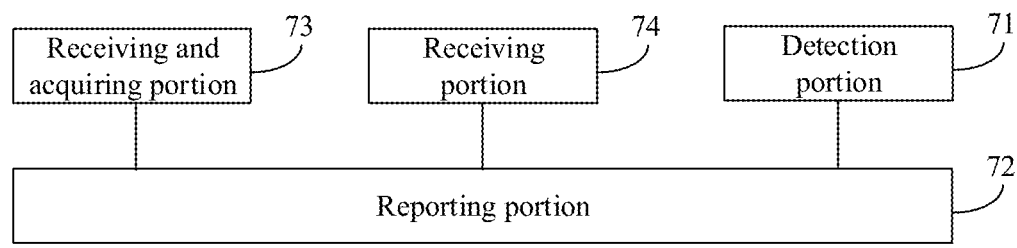
FIG. 8C is a block diagram of another device for indicating multiplex transmission of multi-service data according to some embodiments of the present disclosure.

FIG. 8C is a block diagram of another device for indicating multiplex transmission of multi-service data according to some embodiments of the present disclosure. As shown in FIG. 8C, based on the embodiment shown in FIG. 7, the device may further include a receiving and acquiring portion 73 or a receiving portion 74.

The receiving and acquiring portion 73 is configured to, before the reporting portion 72 reports the service-multiplexing indication information to the base station, receive first configuration information and second configuration information from the base station, determine whether to report the service-multiplexing indication information to the base station or not according to the first configuration information and, when the service-multiplexing indication information is determined to be reported to the base station according to the first configuration information, acquire at least one of a time-frequency resource position, a reporting period and a transmission beam to be used for reporting the service-multiplexing indication information according to the second configuration information.

The terminal may determine whether to report the service-multiplexing indication information to the base station or not according to the first configuration information. The first configuration information or the second configuration information may be contained in RRC signaling, a MAC CE or physical-layer signaling.

In the embodiment, the first configuration information and the second configuration information may be the same configuration information, namely, information about whether to report the service-multiplexing indication information to the base station or not and information including at least one of the time-frequency resource position, reporting period and transmission beam to be used for reporting the service-multiplexing indication information may be contained in the same configuration information. The first configuration information and the second configuration information may also be different configuration information, namely, information about whether to report the service-multiplexing indication information to the base station or not and information including at least one of the time-frequency resource position, reporting period and transmission beam to be used for reporting the service-multiplexing indication information may be contained in different configuration information.

The receiving portion 74 is configured to, before the reporting portion 72 reports the service-multiplexing indication information to the base station, receive information sent by the base station in a predefined manner, the information including at least one of a time-frequency resource position, a reporting period and a transmission beam to be used for reporting the service-multiplexing indication information.

In the embodiment, the terminal may acquire at least one of the time-frequency resource position, reporting period and transmission beam to be used for reporting the service-multiplexing indication information from the configuration information sent by the base station and report the service-multiplexing indication information to the base station according to at least one of the time-frequency resource position, reporting period and transmission beam to be used for reporting the service-multiplexing indication information.

In addition, the terminal may also report the service-multiplexing indication information to the base station according to at least one of the time-frequency resource position, reporting period and transmission beam to be used. predetermined with the base station for reporting the service-multiplexing indication information. In some embodiments, the terminal may further receive at least one of the time-frequency resource position, reporting period and transmission beam to be used for reporting the service-multiplexing indication information from the configuration information sent by the base station in a predefined manner and report the service-multiplexing indication information to the base station according to at least one of the time-frequency resource position, reporting period and transmission beam to be used for reporting the service-multiplexing indication information.

According to the embodiment, at least one of the time-frequency resource position, reporting period and transmission beam to be used for reporting the service-multiplexing indication information may be acquired in multiple manners, so that the implementation manner is flexible and diversified.

Figure 9:
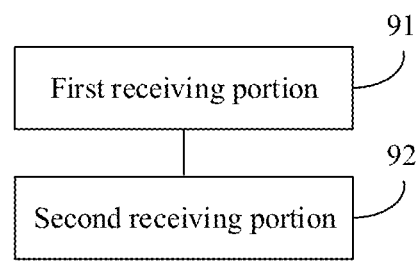
FIG. 9 is a block diagram of a device for multiplex transmission of multi-service data according to some embodiments of the present disclosure.

FIG. 9 is a block diagram of a device for multiplex transmission of multi-service data according to some embodiments of the present disclosure. As shown in FIG. 9, the device may include a first receiving portion 91 and a second receiving portion 92.

The first receiving portion 91 is configured to receive service-multiplexing indication information reported by a terminal, the service-multiplexing indication information being transmitted by the terminal when it is detected that first service data is transmitted on a pre-configured first transmission resource and the first transmission resource being a transmission resource capable of multiplex transmission of second service data and the first service data.

The service-multiplexing indication information may include at least one of a time-domain resource position occupied by the first service data and a frequency-domain resource position occupied by the first service data, and may further include a transmission waveform for the first service data.

When the service-multiplexing indication information includes the time-domain resource position occupied by the first service data, the time-domain resource position may be indicated based on a structure of a time-domain transmission unit of the first service data, may also be indicated based on a structure of a time-domain transmission unit of the second service data, and may also be indicated based on a structure of a predefined or predetermined time-domain transmission unit.

The time-domain transmission unit of the first service data, the time-domain transmission unit of the second service data and a predefined or default time-domain transmission unit may transmit service data by taking an OFDM symbol, a slot, a subframe or a radio frame, etc. as a unit; each time-domain transmission unit may include the first transmission resource and a second transmission resource, and the second transmission resource may be configured to transmit the second service data.

When the service-multiplexing indication information includes the frequency-domain resource position, the frequency-domain resource position may be indicated based on a PRB.

The first service data may have higher priority than the second service data. For example, a delay requirement of the first service data is higher than that of the second service data. The first service data may include, but not limited to, URLLC data, and the second service data may include, but not limited to, eMBB data.

The second receiving portion 92 is configured to receive the first service data according to the service-multiplexing indication information received by the first receiving portion 91.

In the embodiment, the first service data may be parsed according to at least one of the time-domain resource position, frequency-domain resource position and transmission waveform occupied by the first service data, and the first service data is received. For example, the first service data may be parsed according to the transmission waveform for the first service data, and the first service data is received.

According to the embodiment, the service-multiplexing indication information reported by the terminal is received, a data transmission condition of the terminal may be obtained according to the service-multiplexing indication information, and then the first service data may be received, so that invalid detection of a base station can be avoided, and a utilization rate of the transmission resource can be increased.

Figure 10:
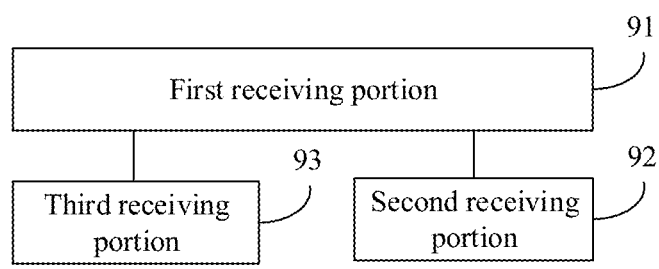
FIG. 10 is a block diagram of another device for multiplex transmission of multi-service data according to some embodiments of the present disclosure.

FIG. 10 is a block diagram of another device for multiplex transmission of multi-service data according to some embodiments of the present disclosure. As shown in FIG. 10, based on the embodiment shown in FIG. 9, the device may further include a third receiving portion 93.

The third receiving portion 93 is configured to, after the first receiving portion 91 receives the service-multiplexing indication information reported by the terminal, when it is detected that the first transmission resource is occupied by the first service data, receive the second service data according to the service-multiplexing indication information, the first service data having higher priority than the second service data.

The priority of the first service data may be higher than the priority of the second service data.

In the embodiment, after the first service data is parsed according to at least one of the time-domain resource position, frequency-domain resource position and transmission waveform for the first service data, the first service data may be removed from parsed service data on the first transmission resource, for example, the first service data parsed according to the transmission waveform for the first service data may be removed from the parsed service data on the first transmission resource, to obtain the second service data on the first transmission resource. The second service data on a second transmission resource may be parsed and received according to an existing manner.

According to the embodiment, when it is detected that the first transmission resource is occupied by the first service data, the second service data may be received according to the service-multiplexing indication information, so that multiplex transmission of multiple service data is implemented.

Figure 11:
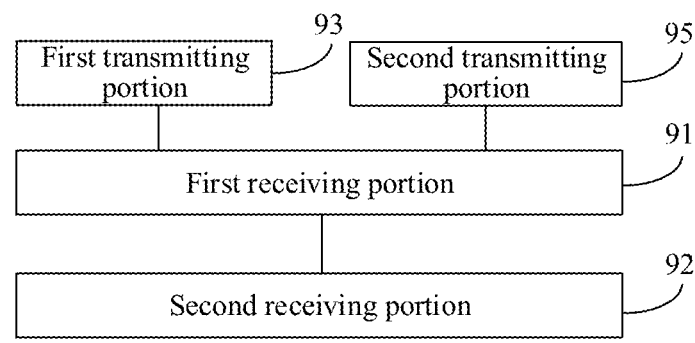
FIG. 11 is a block diagram of another device for multiplex transmission of multi-service data according to some embodiments of the present disclosure.

FIG. 11 is a block diagram of another device for multiplex transmission of multi-service data according to some embodiments of the present disclosure. As shown in FIG. 11, based on the embodiment shown in FIG. 9, the device may further include a first transmitting portion 94 or a second transmitting portion 95.

The first transmitting portion 94 is configured to, before the first receiving portion 91 receives the service-multiplexing indication information reported by the terminal, transmit first configuration information and second configuration information to the terminal; the first configuration information is for configuring the terminal whether to report the service-multiplexing indication information or not and, in a case that the terminal is configured by the first configuration information to report the service-multiplexing indication information, the second configuration information includes at least one of a time-frequency resource position, a reporting period and a transmission beam to be used for reporting the service-multiplexing indication information.

The second transmitting portion 95 is configured to, before the first receiving portion 91 receives the service-multiplexing indication information reported by the terminal, transmit at least one of the time-frequency resource position, reporting period and transmission beam to be used for reporting the service-multiplexing indication information to the terminal in a predefined manner.

The first configuration information or the second configuration information may be contained in RRC signaling, a MAC CE or physical-layer signaling.

In the embodiment, the first configuration information and the second configuration information may be the same configuration information, namely, information about whether to report the service-multiplexing indication information to the base station or not and information including at least one of the time-frequency resource position, reporting period and transmission beam to be used for reporting the service-multiplexing indication information may be contained in the same configuration information. The first configuration information and the second configuration information may also be different configuration information, namely, information about whether to report the service-multiplexing indication information to the base station or not and information including at least one of the time-frequency resource position, reporting period and transmission beam to be used for reporting the service-multiplexing indication information may be contained in different configuration information.

In addition, the base station may also transmit at least one of the time-frequency resource position, reporting period and transmission beam to be used for reporting the service-multiplexing indication information to the terminal in a predefined manner.

According to the embodiment, at least one of the time-frequency resource position, reporting period and transmission beam to be used for reporting the service-multiplexing indication information may be notified to the terminal by transmitting the first configuration information and the second configuration information or in a predefined manner, thereby providing a condition for subsequently reporting the service-multiplexing indication information to the base station according to at least one of the time-frequency resource position, reporting period and transmission beam to be used for reporting the service-multiplexing indication information.

Figure 12:
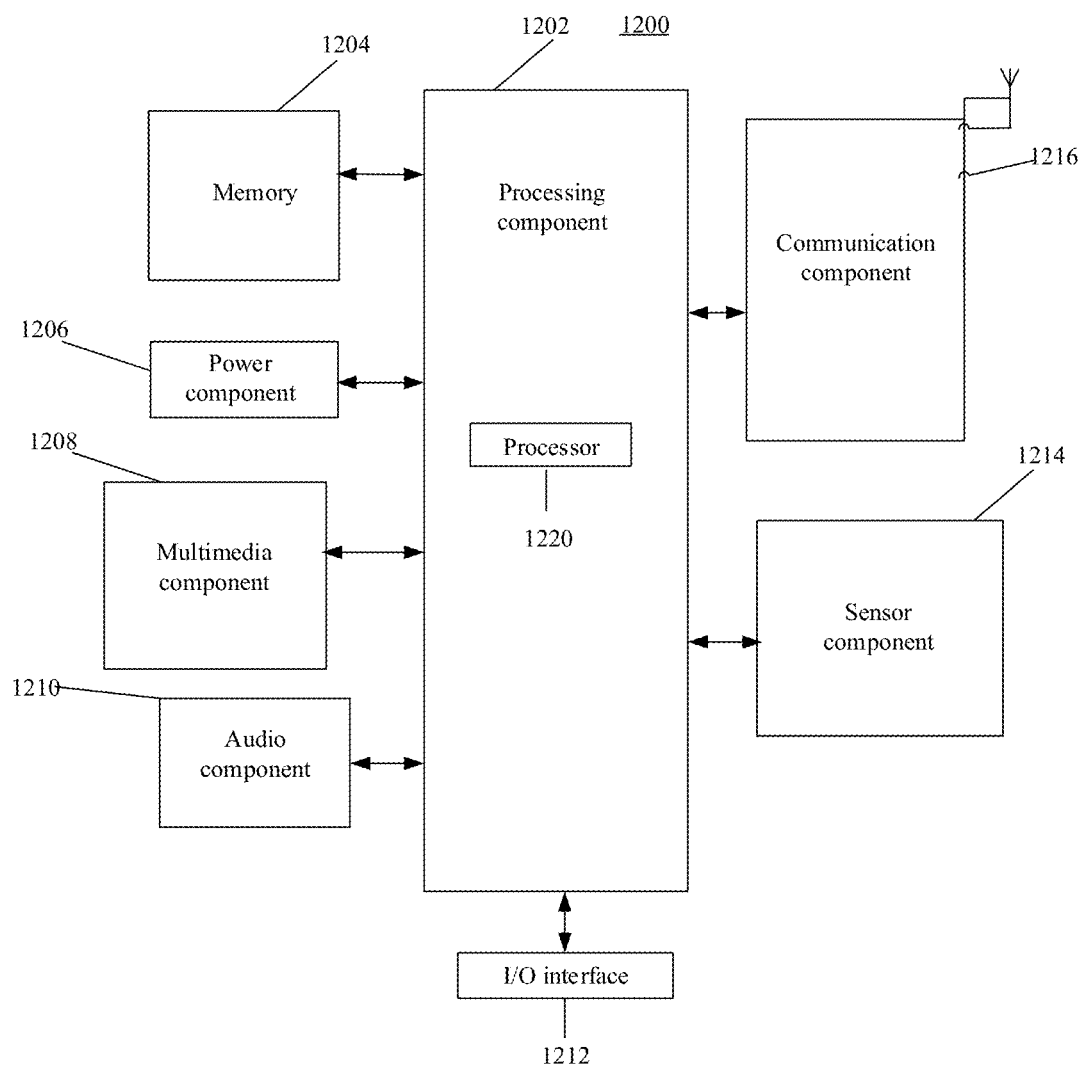
FIG. 12 is a block diagram applicable to a device for indicating multiplex transmission of multi-service data according to some embodiments of the present disclosure.

FIG. 12 is a block diagram applicable to a device for indicating multiplex transmission of multi-service data according to some embodiments of the present disclosure. For example, the device 1200 may be a terminal such as a mobile phone, a computer, a digital broadcast terminal, a messaging device, a gaming console, a tablet, a medical device, exercise equipment and a personal digital assistant.

Referring to FIG. 12, the device 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 is typically configured to control overall operations of the device 1200, such as the operations associated with display, telephone calls, data communications, camera operations, and recording operations. The processing component 1202 may include one or more processors 1220 to execute instructions to perform all or part of the blocks in the above-mentioned method. Moreover, the processing component 1202 may include one or more portions which facilitate interaction between the processing component 1202 and the other components. For instance, the processing component 1202 may include a multimedia portion to facilitate interaction between the multimedia component 1208 and the processing component 1202.

The memory 1204 is configured to store various types of data to support the operation of the device 1200. Examples of such data may include instructions for any application programs or methods operated on the device 1200, contact data, phonebook data, messages, pictures, video, etc. The memory 1204 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 is configured to provide power for various components of the device 1200. The power component 1206 may include a power management system, one or more power supplies, and other components associated with generation, management and distribution of power for the device 1200.

The multimedia component 1208 may include a screen providing an output interface between the device 1200 and a user. In some embodiments, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the device 1200 is in the operation mode, such as a call mode, a recording mode and a voice recognition mode. The received audio signal may further be stored in the memory 1204 or transmitted through the communication component 1216. In some embodiments, the audio component 1210 further includes a speaker configured to output the audio signal.

The I/O interface 1212 is configured to provide an interface between the processing component 1202 and a peripheral interface portion, and the peripheral interface portion may be a keyboard, a click wheel, a button and the like. The button may include, but not limited to: a home button, a volume button, a starting button and a locking button.

The sensor component 1214 may include one or more sensors configured to provide status assessment in various aspects for the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and another device. The device 1200 may access a communication-standard-based wireless network, such as a Wireless Fidelity (Wi-Fi) network, a $2^{nd}$-Generation (2G), $3^{rd}$-Generation (3G), $4^{th}$-Generation (4G), or $5^{th}$-Generation (5G) network or a combination thereof. In some embodiments, the communication component 1216 receives a broadcast signal or broadcast associated information from an external broadcast management system through a broadcast channel. In some embodiments, the communication component 1216 may further include a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned method.

In some embodiments, there is also provided a non-transitory computer-readable storage medium including instructions, such as the memory 1204 including instructions, and the instructions may be executed by the processor 1220 of the device 1200 to implement the above-mentioned methods. For example, the non-transitory computer-readable storage medium may be a ROM, a RAM, a D-ROM, a magnetic tape, a floppy disc, an optical data storage device and the like.

Figure 13:
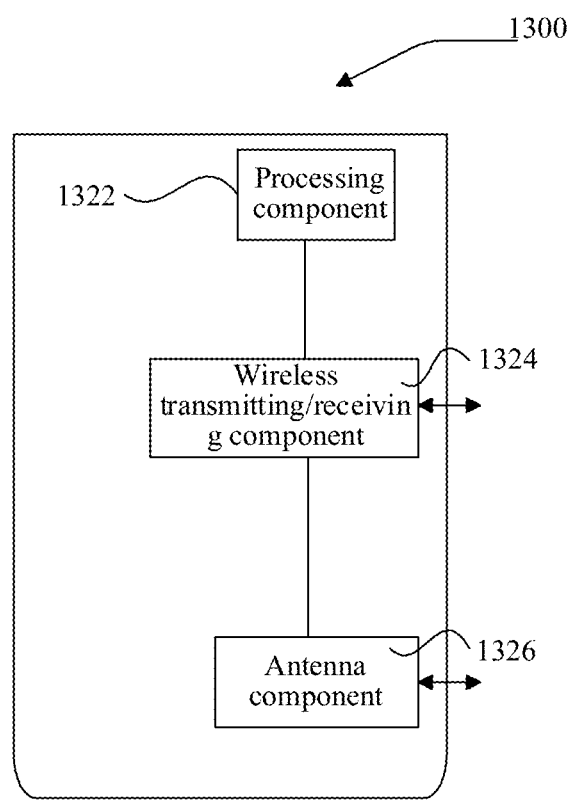
FIG. 13 is a block diagram applicable to another device for indicating multiplex transmission of multi-service data according to some embodiments of the present disclosure.

FIG. 13 is a block diagram applicable to another device for indicating multiplex transmission of multi-service data according to some embodiments of the present disclosure. The device 1300 may be provided as a base station. Referring to FIG. 13, the device 1300 includes a processing component 1322, a wireless transmitting/receiving component 1324, an antenna component 1326 and a wireless interface-specific signal processing part, and the processing component 1322 may further include one or more processors.

One processor in the processing component 1322 may be configured to:

receive service-multiplexing indication information reported by a terminal, the service-multiplexing indication information being transmitted by the terminal when it is detected that first service data is transmitted on a preconfigured first transmission resource and the first transmission resource being a transmission resource capable of multiplex transmission of second service data and the first service data; and receive the first service data according to the service-multiplexing indication information.

According to the embodiments of the present disclosure, when it is detected that first service data is transmitted on a first transmission resource that may be multiplexed to transmit the first service data and second service data, service-multiplexing indication information may be reported to a base station to enable the base station to know about a data transmission condition of a terminal according to the service-multiplexing indication information and receive the first service data, so that invalid detection of the base station can be avoided, and a utilization rate of the transmission resource can be increased.

When it is confirmed that the first transmission resource is occupied by the first service data, the second service data is stopped to be transmitted on the first transmission resource, so that multiplex transmission of data of multiple service types can be implemented.

The service-multiplexing indication information may be reported to the base station in multiple manners through multiple channels, so that implementations can be flexible and diversified.

The solution can be clearer by making restrictions to the content of the service-multiplexing indication information.

The solution can be further clearer by further restricting the content of the service-multiplexing indication information.

The solution can be clearer by restricting manners for indicating a time-domain resource position and a frequency-domain resource position and limiting structures of time-domain transmission units.

The service-multiplexing indication information may be reported to the base station according to at least one of a time-frequency resource position, a reporting period and a transmission beam to be used, predetermined with the base station for reporting the service-multiplexing indication information. Thus, the implementation manner can be simple.

At least one of the time-frequency resource position, reporting period and transmission beam to be used for reporting the service-multiplexing indication information may be acquired in multiple manners, so that implementation manners can be flexible and diversified.

The service-multiplexing indication information may be reported to the base station according to at least one of the acquired or received time-frequency resource position, reporting period and transmission beam to be used for reporting the service-multiplexing indication information, which provides another manner of reporting the service-multiplexing indication information.

The solution can be clearer by restricting a position containing the first configuration information or the second configuration information and making a limitation that the first configuration information and the second configuration information can be the same or different.

The first service data may be received after receiving service-multiplexing indication information reported by the terminal and obtaining the data transmission condition of the terminal according to the service-multiplexing indication information, so that invalid detection of the base station can be avoided, and the utilization rate of the transmission resource can be increased.

When it is detected that the first transmission resource is occupied by the first service data, the second service data may be received according to the service-multiplexing indication information, so that multiplex transmission of multiple service data can be implemented.

The solution can be clearer by making restrictions to the content of the service-multiplexing indication information.

The solution can be further clearer by further restricting the content of the service-multiplexing indication information.

The solution can be clearer by restricting manners for indicating a time-domain resource position and a frequency-domain resource position and limiting structures of time-domain transmission units.

The first service data may be parsed according to the transmission waveform for the first service data, and the first service data may be removed from the service data on the first transmission resource to obtain the second service data on the first transmission resource, so that the implementation mode is simple.

At least one of a time-frequency resource position, a reporting period and a transmission beam to be used for reporting the service-multiplexing indication information may be notified to the terminal by transmitting first configuration information and second configuration information or in a predefined manner, thereby providing a condition for subsequently reporting the service-multiplexing indication information to the base station according to at least one of the time-frequency resource position, reporting period and transmission beam to be used for reporting the service-multiplexing indication information.

The solution can be clearer by limiting the position for carrying the first configuration information or the second configuration information and making a restriction that the first configuration information and the second configuration information are the same or different.

The device embodiments substantially correspond to the method embodiments, and thus related parts may refer to part of descriptions of the method embodiments. The device embodiment described above is only schematic, units described as separate parts therein may be physically separated or not, and parts displayed as units may be physical units or not, and namely may be located in the same place or distributed to multiple network units. Part or all of the modules therein may be selected according to a practical requirement to achieve the purpose of the solutions of the embodiments. Those of ordinary skill in the art may understand and implement without creative work.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for indicating multiplex transmission of multi-service data, comprising:
    detecting that first service data is transmitted on a first transmission resource which is pre-configured, the first transmission resource being a transmission resource capable of multiplex transmission of second service data and the first service data; and
    reporting service-multiplexing indication information to a base station,
    wherein the method further comprises:
    before detecting that the first service data is transmitted on the first transmission resource, in a case that it is confirmed that the first transmission resource is occupied by the first service data, stop transmitting the second service data on the first transmission resource, the first service data having higher priority than the second service data.

2. A device configured to indicate multiplex transmission of multi-service data, comprising:
    a processing circuit configured to detect that first service data is transmitted on a first transmission resource which is pre-configured, the first transmission resource being a transmission resource capable of multiplex transmission of second service data and the first service data; and
    a communication component, configured to, after the processing component detects that the first service data is transmitted on the first transmission resource which is pre-configured, report service-multiplexing indication information to a base station,
wherein the communication component is further configured to:
before the detection portion detects that the first service data is transmitted on the first transmission resource, in a case that it is confirmed that the first transmission resource is occupied by the first service data, stop transmitting the second service data on the first transmission resource, the first service data having higher priority than the second service data.

3. The device of claim 2, wherein the communication component is further configured to:
report service-multiplexing indication information of each transmission unit corresponding to the first transmission resource to the base station through a Physical Uplink Control Channel (PUCCH), a Physical Uplink Shared Channel (PUSCH) or a newly defined channel; or
simultaneously report service-multiplexing indication information of all or part of transmission units corresponding to the first transmission resource to the base station through a PUCCH, a PUSCH or a newly defined channel.

4. The device of claim 2, wherein the service-multiplexing indication information comprises at least one of a time-domain resource position occupied by the first service data and a frequency-domain resource position occupied by the first service data.

5. The device of claim 4, wherein the service-multiplexing indication information further comprises a transmission waveform for the first service data.

6. The device of claim 4, wherein the time-domain resource position is indicated based on a structure of a time-domain transmission unit of the first service data, a structure of a time-domain transmission unit of the second service data or a structure of a predefined time-domain transmission unit; the frequency-domain resource position is indicated based on a Physical Resource Block (PRB); the time-domain transmission unit of the first service data, the time-domain transmission unit of the second service data or a predefined time-domain transmission unit comprises the first transmission resource and a second transmission resource, and the second transmission resource is configured to transmit the second service data.

7. The device of claim 2, wherein the communication component is further configured to report the service-multiplexing indication information to the base station according to information predetermined with the base station, the information comprising at least one of a time-frequency resource position, a reporting period and a transmission beam to be used for reporting the service-multiplexing indication information.

8. The device of claim 2, wherein
the processing circuit is further configured to: before reporting the service-multiplexing indication information to the base station, receive first configuration information and second configuration information from the base station, determine whether to report the service-multiplexing indication information to the base station or not according to the first configuration information, and,
the communication component is further configured to:
when the service-multiplexing indication information is determined to be reported to the base station according to the first configuration information, acquire at least one of a time-frequency resource position, a reporting period and a transmission beam to be used for reporting the service-multiplexing indication information according to the second configuration information; or
before reporting the service-multiplexing indication information to the base station, receive information transmitted by the base station in a predefined manner, the information comprising at least one of a time-frequency resource position, a reporting period and a transmission beam to be used for reporting the service-multiplexing indication information.

9. The device of claim 8, wherein the communication component is further configured to report the service-multiplexing indication information to the base station according to the information acquired, the information acquired comprising at least one of the time-frequency resource position, the reporting period and the transmission beam to be used for reporting the service-multiplexing indication information.

10. The device of claim 8, wherein the first configuration information or the second configuration information is contained in Radio Resource Control (RRC) signaling, a Media Access Control (MAC) Control Element (CE) or physical-layer signaling, and the first configuration information and the second configuration information are the same or different.

11. A device configured for multiplex transmission of multi-service data, comprising a wireless transmitting/receiving component configured to:
receive service-multiplexing indication information reported by a terminal, the service-multiplexing indication information being transmitted by the terminal when it is detected that first service data is transmitted on a first transmission resource which is pre-configured and the first transmission resource being a transmission resource capable of multiplex transmission of second service data and the first service data; and
receive the first service data according to the service-multiplexing indication information received by the first receiving portion,
wherein the wireless transmitting/receiving component is further configured to:
after the first receiving portion receives the service-multiplexing indication information reported by the terminal, when it is detected that the first transmission resource is occupied by the first service data, receive the second service data according to the service-multiplexing indication information, the first service data having higher priority than the second service data.

12. The device of claim 11, wherein the service-multiplexing indication information comprises at least one of a time-domain resource position occupied by the first service data and a frequency-domain resource position occupied by the first service data.

13. The device of claim 12, wherein the service-multiplexing indication information further comprises a transmission waveform for the first service data.

14. The device of claim 12, wherein the time-domain resource position is indicated based on a structure of a time-domain transmission unit of the first service data, a structure of a time-domain transmission unit of the second service data or a structure of a predefined time-domain transmission unit; the frequency-domain resource position is indicated based on a Physical Resource Block (PRB); the time-domain transmission unit of the first service data, the time-domain transmission unit of the second service data or the predefined time-domain transmission unit comprises the first transmission resource and a second transmission resource, and the second transmission resource is configured to transmit the second service data.

15. The device of claim 13, further comprising a processing circuit configured to:
  parse the first service data according to the transmission waveform for the first service data and control the wireless transmitting/receiving component to receive the first service data; and
  parse service data on the first transmission resource and remove the first service data from the service data on the first transmission resource to obtain the second service data on the first transmission resource.

16. The device of claim 11, wherein the wireless transmitting/receiving component is further configured to:
  before the service-multiplexing indication information reported by the terminal is received, transmit first configuration information and second configuration information to the terminal, wherein the first configuration information is for configuring the terminal whether to report the service-multiplexing indication information or not and, in a case that the terminal is configured by the first configuration information to report the service-multiplexing indication information, the second configuration information comprises at least one of a time-frequency resource position, a reporting period and a transmission beam to be used for reporting the service-multiplexing indication information; or
  before the service-multiplexing indication information reported by the terminal is received, transmit at least one of a time-frequency resource position, a reporting period and a transmission beam to be used for reporting the service-multiplexing indication information to the terminal in a predefined manner.

17. The device of claim 16, wherein the first configuration information and the second configuration information are contained in Radio Resource Control (RRC) signaling, a Media Access Control (MAC) Control Element (CE) or physical-layer signaling, and the first configuration information and the second configuration information are the same or different.

18. A terminal implementing the method of claim 1, comprising:
  a processing circuit; and
  a memory device configured to store an instruction executable by the processing circuit,
  a communication component configured to be controlled by the processing circuit to transmit and receive information;
  wherein the terminal is configured to:
  report the service-multiplexing indication information to the base station to inform the base station about a data transmission condition of the terminal, thereby facilitating the base station receiving the first service data and avoiding invalid detection of the base station and increasing a utilization rate of the transmission resource; and
  upon confirmation that the first transmission resource is occupied by the first service data, the second service data is stopped to be transmitted on the first transmission resource, such that multiplex transmission of data of multiple service types is implemented.

* * * * *